United States Patent
Creary et al.

(10) Patent No.: US 8,095,800 B2
(45) Date of Patent: Jan. 10, 2012

(54) SECURE CONFIGURATION OF PROGRAMMABLE LOGIC DEVICE

(75) Inventors: Jamey Mario Creary, Gilbert, AZ (US); Paul Robert Handly, Gilbert, AZ (US); Andrew Daniel Armstrong, Gilbert, AZ (US)

(73) Assignee: General Dynamics C4 System, Inc., Scottsdale, AZ (US)

( * ) Notice: Subject to any disclaimer, the term of this patent is extended or adjusted under 35 U.S.C. 154(b) by 612 days.

(21) Appl. No.: 12/275,097

(22) Filed: Nov. 20, 2008

(65) Prior Publication Data

US 2010/0125739 A1    May 20, 2010

(51) Int. Cl.
  *G06F 11/30* (2006.01)
(52) U.S. Cl. ........................................ 713/189
(58) Field of Classification Search .......... 713/189, 713/169, 193, 171, 168, 191, 200, 194, 170, 713/165; 326/39, 8, 10, 37, 41, 38, 29; 380/277, 380/44, 30, 268; 716/116, 117, 121
  See application file for complete search history.

(56) References Cited

U.S. PATENT DOCUMENTS

| | | | |
|---|---|---|---|
| 5,388,157 A | | 2/1995 | Austin |
| 5,915,017 A | | 6/1999 | Sung et al. |
| 5,970,142 A | * | 10/1999 | Erickson ................ 713/189 |
| 6,212,639 B1 | * | 4/2001 | Erickson et al. ............ 726/26 |
| 6,356,637 B1 | | 3/2002 | Garnett |
| 6,654,889 B1 | * | 11/2003 | Trimberger ................ 713/191 |
| 7,162,644 B1 | * | 1/2007 | Trimberger ................ 713/189 |
| 7,408,381 B1 | * | 8/2008 | Drimer et al. ................ 326/41 |
| 7,484,081 B1 | * | 1/2009 | Langhammer et al. .......... 713/1 |
| 7,783,897 B2 | * | 8/2010 | McLean et al. ............... 713/189 |
| 2003/0226029 A1 | * | 12/2003 | Porter et al. ................. 713/200 |
| 2007/0083665 A1 | * | 4/2007 | Miao ............................ 709/230 |
| 2009/0147956 A1 | * | 6/2009 | Rousseau et al. ............. 380/257 |
| 2009/0249080 A1 | * | 10/2009 | Zhang et al. ................. 713/187 |

* cited by examiner

*Primary Examiner* — Saleh Najjar
*Assistant Examiner* — Shu Chun Gao
(74) *Attorney, Agent, or Firm* — Meschkow & Gresham, P.L.C.

(57) ABSTRACT

A cryptographic system (100) and methodology executable within the cryptographic system (100) enable the use of a programmable logic device PLD (108) in a single chip cryptographic design flow for secure cryptographic services. Methodology for secure configuration of the PLD (108) within a cryptographic system 100 entails secure configuration and authentication (202), functional verification (204), configuration key reload capability (206), traffic key load capability (208) using a split key technique, isolation between command and key fill domains for secure key fill (210) of key material, redundant system instantiation (212), and high speed comparison for secure operation.

25 Claims, 14 Drawing Sheets

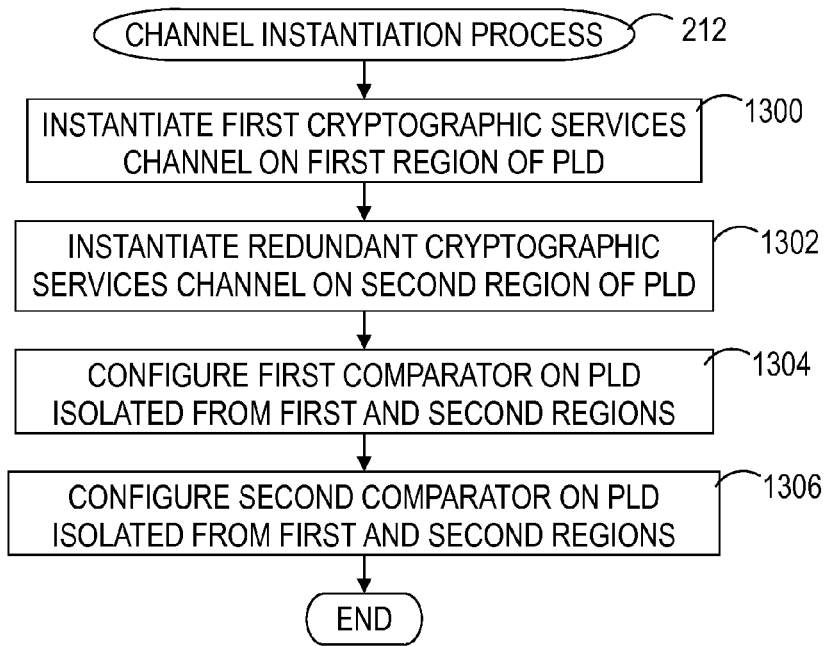
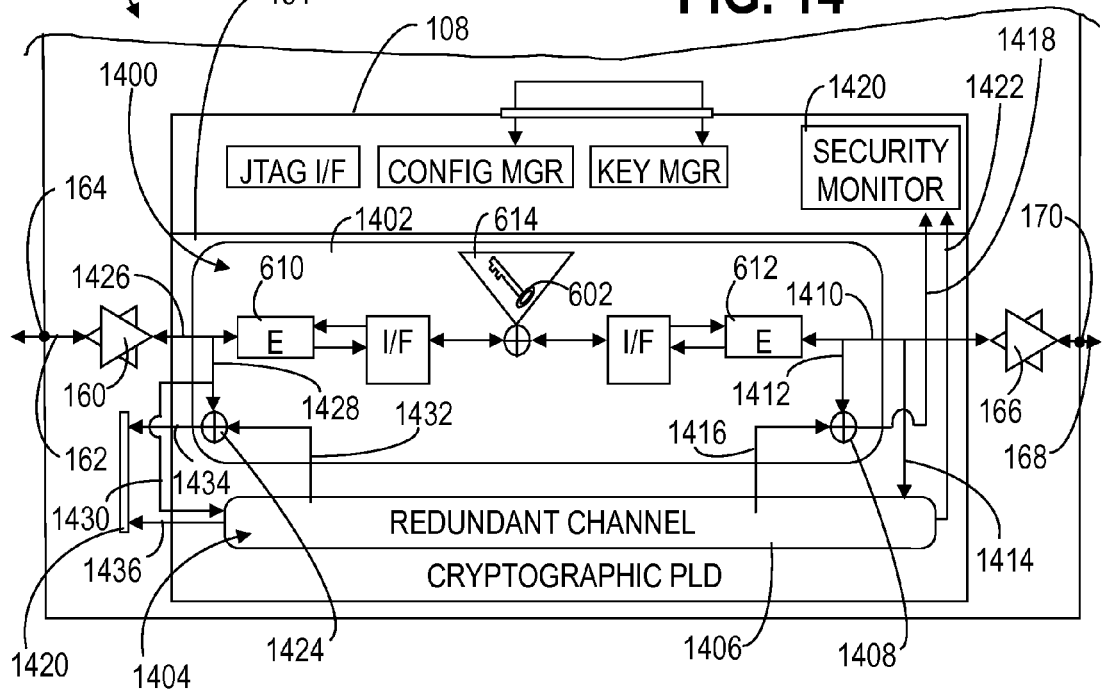

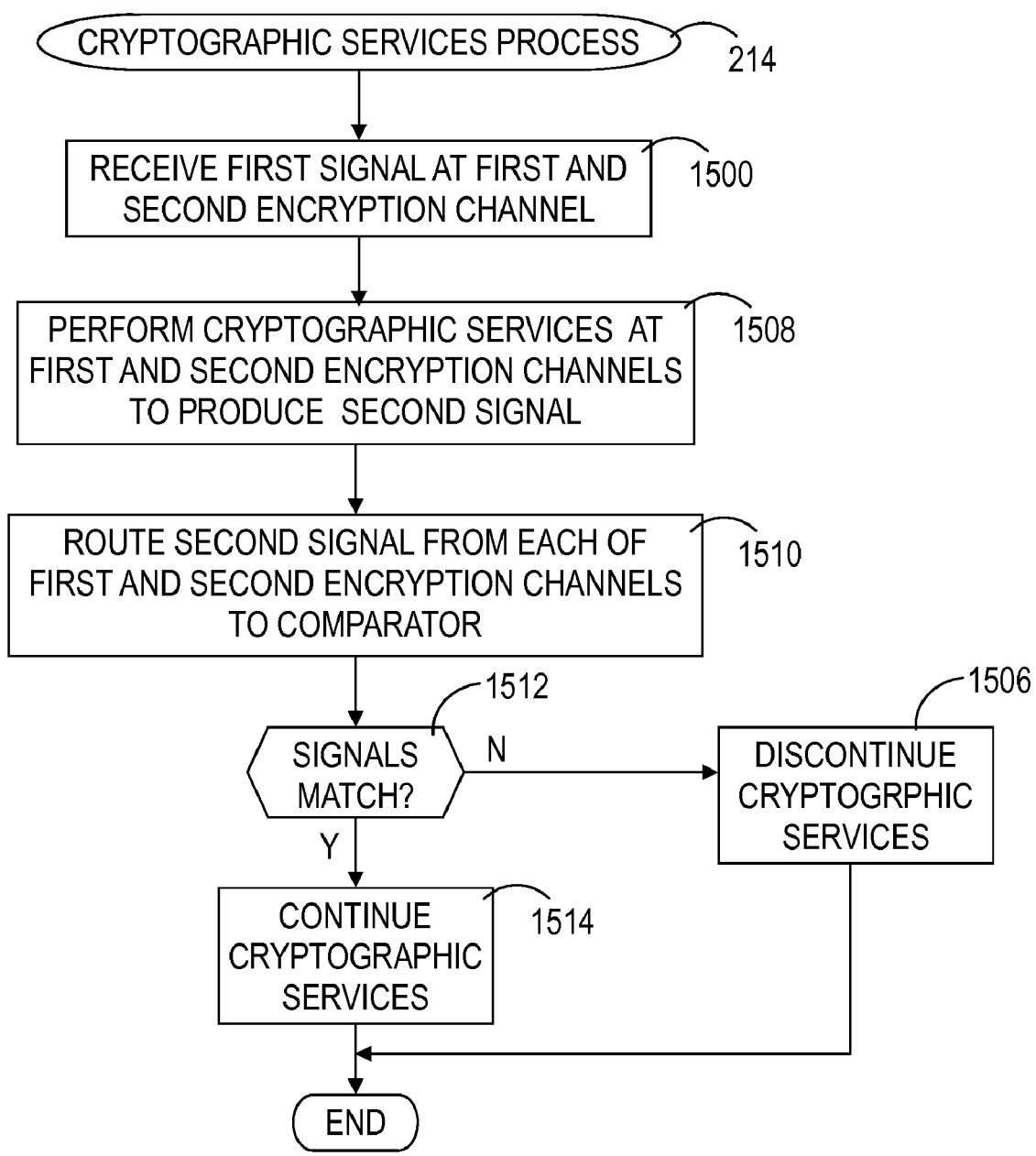

SECURE CONFIGURATION OF PROGRAMMABLE LOGIC DEVICE

TECHNICAL FIELD OF THE INVENTION

The present invention relates to the field of programmable logic devices. More specifically, the present invention relates to a method for the secure configuration of programmable logic devices especially for use in cryptographic systems.

BACKGROUND OF THE INVENTION

A programmable logic device (PLD) is an electronic component used to build reconfigurable digital circuits. Examples of PLDs include field programmable gate arrays (FPGAs), erasable programmable logic devices (EPLDs), and so forth. Unlike a logic gate, which has a fixed function, a PLD has an undefined function at the time of manufacture. Thus, before a PLD can be used in a circuit it must be programmed, or configured. Typically, such PLDs are based on volatile technology in which a PLD loses its configuration when power is removed. Therefore, the PLD is reconfigured on power-up by reloading a configuration data bitstream which is held in non-volatile memory. Once the configuration data from the bitstream is reloaded, the PLD then performs the function of the circuit design.

Reprogrammable logic has been growing in acceptance for cryptographic processing due to its ubiquity, and great achievements have been seen in cryptographic performance, reprogrammability, low developmental costs, and flexibility. PLDs have been equipped to provide encryption of configuration data bitstreams to provide confidentiality for the PLD design. However, there are no known methods for providing the remaining functions of secure startup, including trusted authentication, functional verification of the configured circuit design, reloading of internal (i.e., configuration keys), loading of operational (i.e., traffic keys), isolation of key and control flow domains, or comparison of internal redundant physical regions for proper operations.

Consequently, although typical PLD designs are adequate in conventional reconfigurable digital circuit design, they cannot currently be implemented in cryptographic systems that meet NSA Type 1 certification rules.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 13 shows a flowchart of a redundant system instantiation process performed within the cryptographic system;

FIG. 14 shows a functional block diagram of a portion of the cryptographic system illustrating execution of redundant system instantiation process described in FIG. 13; and FIG. 15 shows a flowchart of a cryptographic services process performed within the cryptographic system.

DETAILED DESCRIPTION OF THE PREFERRED EMBODIMENTS

The present invention entails a configurable system and configuration methodology for enabling a cryptographic programmable logic device (PLD). The configurable system and configuration methodology provide the functions of secure startup, including trusted authentication, functional verification of the configured circuit design, reloading of internal (i.e., configuration) keys, loading of operational (i.e., traffic) keys, isolation of key and control flow domains, and comparison of internal redundant physical regions for proper operations. Accordingly, the system and methodology enable the use of a single PLD for secure operation, meeting National Security Agency (NSA) Type 1 certification rules.

Figure 1:
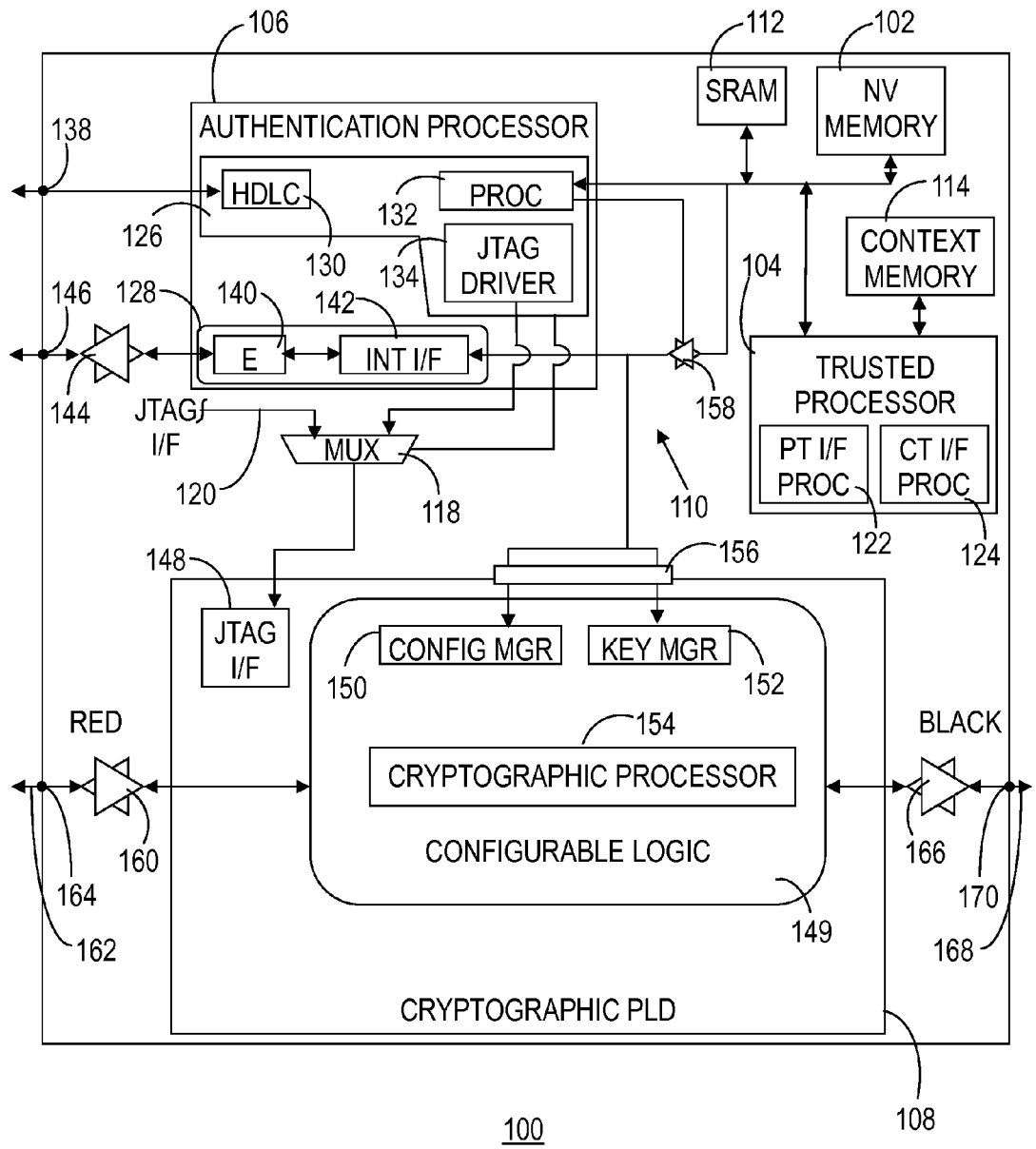
FIG. 1 shows a block diagram of a cryptographic system in accordance with an embodiment of the present invention.
Figure 10:
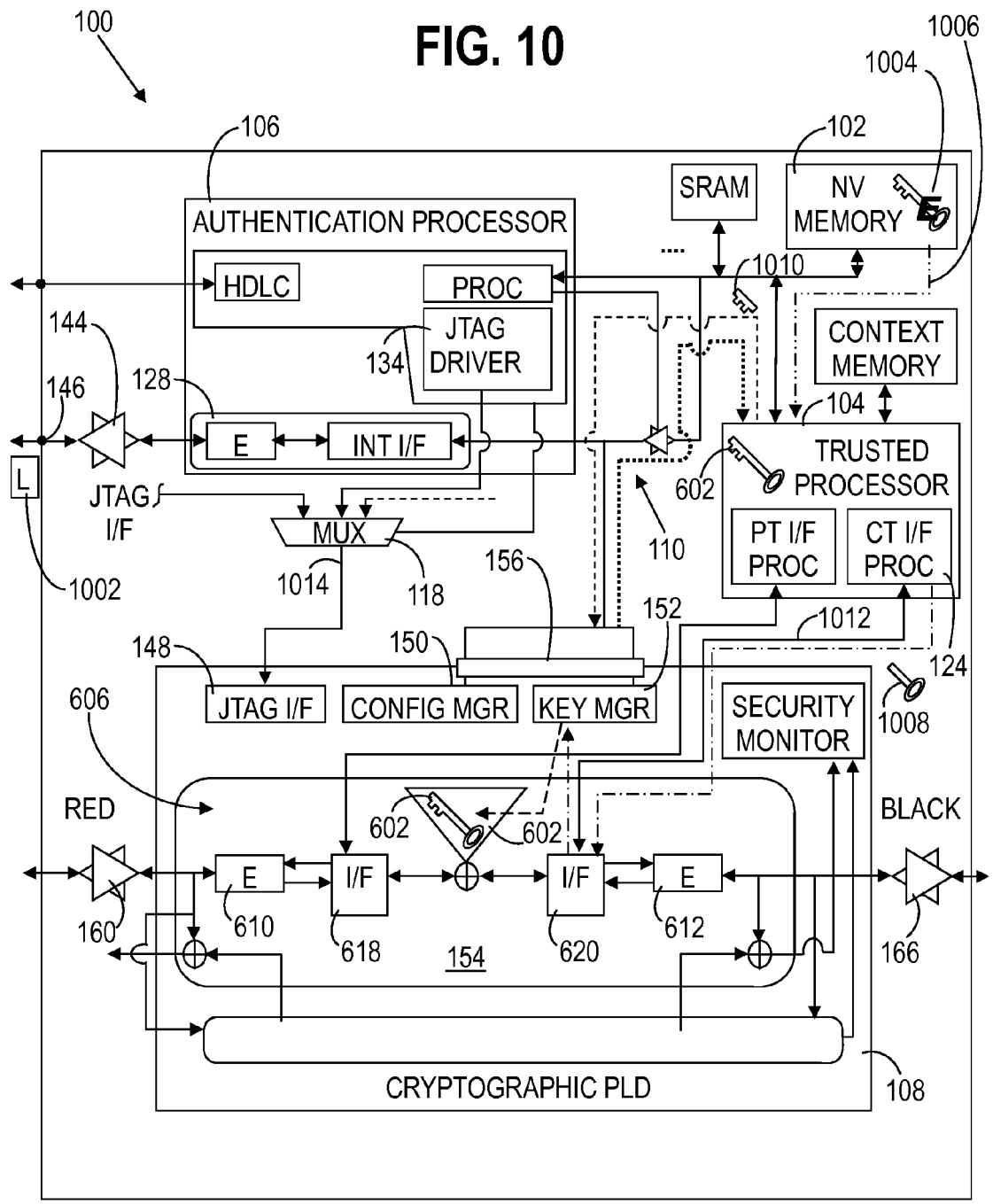
FIG. 10 shows a functional block diagram of the cryptographic system illustrating execution of the traffic key load process described in FIG. 9.

Throughout this discussion, items are assigned three- or four-digit reference numbers whose first digit or first two digits reflects the Figure in which the item first appears. That is, items first appearing in FIG. 1 are assigned reference numbers between 100 and 199, items first appearing in FIG. 10 are assigned reference numbers between 1000 and 1099, etc. Once assigned, a given reference number is used in all Figures in which that item appears.

FIG. 1

FIG. 1 shows a block diagram of a cryptographic system 100 in accordance with an embodiment of the present invention. Cryptographic system 100 is a secure configurable system that includes non-volatile memory 102, a trusted processor 104, an authentication processor 106, and a programmable logic device (PLD) 108, all of which are in selective communication via a communication bus 110. Additional elements may include, but are not limited to, volatile memory (SRAM) 112 accessible via communication bus 110, context memory 114 associated with trusted processor 104, a joint task action group (JTAG) multiplexer (MUX) 118 associated with authentication processor 106, and an internal JTAG interface 120 in communication with JTAG multiplexer 118. Although illustrated separately, in an alternative embodiment, authentication processor 106 may be integrated into trusted processor 104.

In an embodiment, trusted processor 104 includes a plain text interface processor (PT I/F PROC) 122 for outputting plain text packets (discussed below) and a cipher text interface processor (CT I/F PROC) 124 for receiving cipher text packets (discussed below). The function of plain text interface processor 122 and cipher text interface processor 124 are discussed below in connection with FIGS. 5, 6, 9, and 10.

In an embodiment, authentication processor 106 includes a first partition 126 and a second partition 128 that is separate from first partition 126. First and second partitions 126 and 128 are distinct from one another to provide isolation between various domains within system 100, such as, control, key fill, and data domains. An isolation mechanism resulting from implementation of first and second partitions 126 and 128 is discussed below in connection with FIGS. 11 and 12.

First partition 126 of authentication processor 106 may include capabilities such as a high-level data link control (HDLC) 130, a processor 132, and a joint test action group (JTAG) driver 134. HDLC 130 refers to a general purpose data link control protocol which may be used by authentication processor 106 to enable communication between authentication processor 106 and an external node (discussed below) via an external port 138. Processor 132 performs processing and control functions of first partition 126 of authentication processor 106. JTAG driver 134 enables a transfer of data (discussed below) between first partition 126 of authentication processor 106 and JTAG multiplexer 118.

Second partition 128 may include capabilities such as an external interface (E) 140 and an internal interface (INT I/F) 142. External interface 140 is in communication with a transceiver 144. Transceiver 144 enables communication between second partition 128 of authentication processor 106 and an external command node (not shown) via an external port, referred to herein as a command port 146. Internal interface 142 facilitates communication between second partition 128 and trusted processor 114 via bus 110.

In an embodiment, PLD 108 includes a JTAG interface 148 and configurable logic 149. Configurable logic 149 may be configured to include a configuration manager (CONFIG MGR) 150, a key manager (KEY MGR) 152, and a cryptographic processor 154. JTAG interface 148 connects to multiplexor 118. A configuration port 156 for configurable logic 149 connects to memories 102 and 112, trusted processor 104, and authentication processor 106 via bus 110. Bus 110 includes a transceiver 158 for selecting and isolating communication paths (discussed below) within cryptographic system 100.

In an embodiment, cryptographic processor 154 is a portion of configurable logic 154 that is to be configured to provide cryptographic services. Accordingly, cryptographic system 100 includes a transceiver 160 in communication with cryptographic processor 154 for receiving and outputting plain text 162, sometimes referred to as red signals, at a port, referred to herein as a red port 164. In addition, cryptographic system 100 includes a transceiver 166 for receiving and outputting cipher text 168, sometimes referred to as black signals, at another port, referred to herein as a black port 170.

FIG. 2

Figure 2:
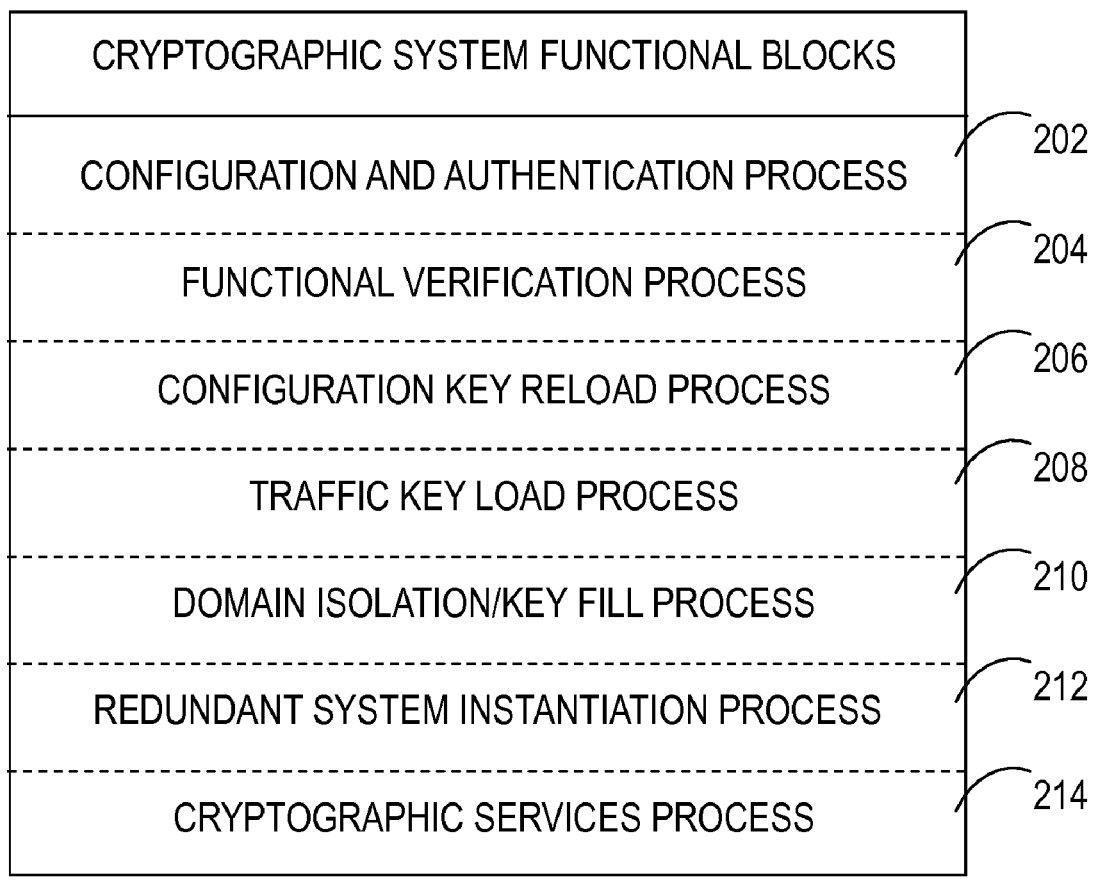
FIG. 2 shows a diagram of functional blocks operational within the cryptographic system of FIG. 1.

FIG. 2 shows a diagram 200 of functional blocks operational within cryptographic system 100. The various elements of cryptographic system 100 execute various processes in the form of executable code. The executable code includes a configuration and authentication process 202, a functional verification process 204, a configuration key reload process 206, a traffic key load process 208, a domain isolation/key fill process 210, a redundant system instantiation process 212, and a cryptographic services process 214.

Cryptographic services process 214 may utilize Advanced Encryption Standard (AES) to provide confidentiality. As known to those skilled in the art, Advanced Encryption Standard is a block cipher adopted as an encryption standard by the United States government. AES is one of the most popular algorithms used in symmetric key cryptography and is available in many different encryption packages.

While a cryptographic services process employing AES may be acceptable for use in a cryptographic PLD in the commercial arena, especially if its implementation or fabrication is of untrusted origin, or for unclassified information, execution of such a process may not ensure secure operation for classified information. As such, a programmable logic device (PLD) may not enable a device in which it is implemented to be a Type 1 product. A Type 1 product is a device or system certified by the National Security Agency (NSA) for use in cryptographically securing classified government information. Type 1 certification is a rigorous process that includes testing and formal analysis of (among other things) cryptographic security, functional security, tamper resistance, security of the product manufacturing and distribution process, and so forth.

Configuration and authentication process 202, functional verification process 204, configuration key reload process 206, traffic key load process 208, domain isolation/key fill process 210, and redundant system instantiation process 212 of cryptographic system 100 collectively form a secure mechanism for providing cryptographic services so as to facilitate certification of cryptographic system 100 as a Type 1 product.

Configuration and authentication process 202 is discussed in detail in connection with FIGS. 3 and 4. Functional verification process 204 is discussed in detail in connection with FIGS. 5 and 6. Configuration key reload process 206 is discussed in detail in connection with FIGS. 7 and 8. Traffic key load process 208 is discussed in detail in connection with FIGS. 9 and 10. Domain isolation/key fill process 210 is discussed in detail in connection with FIGS. 11 and 12. Redundant system instantiation process 212 is discussed in detail in connection with FIGS. 13 and 14, and cryptographic services process 214 is discussed in connection with FIG. 15.

Figure 3:
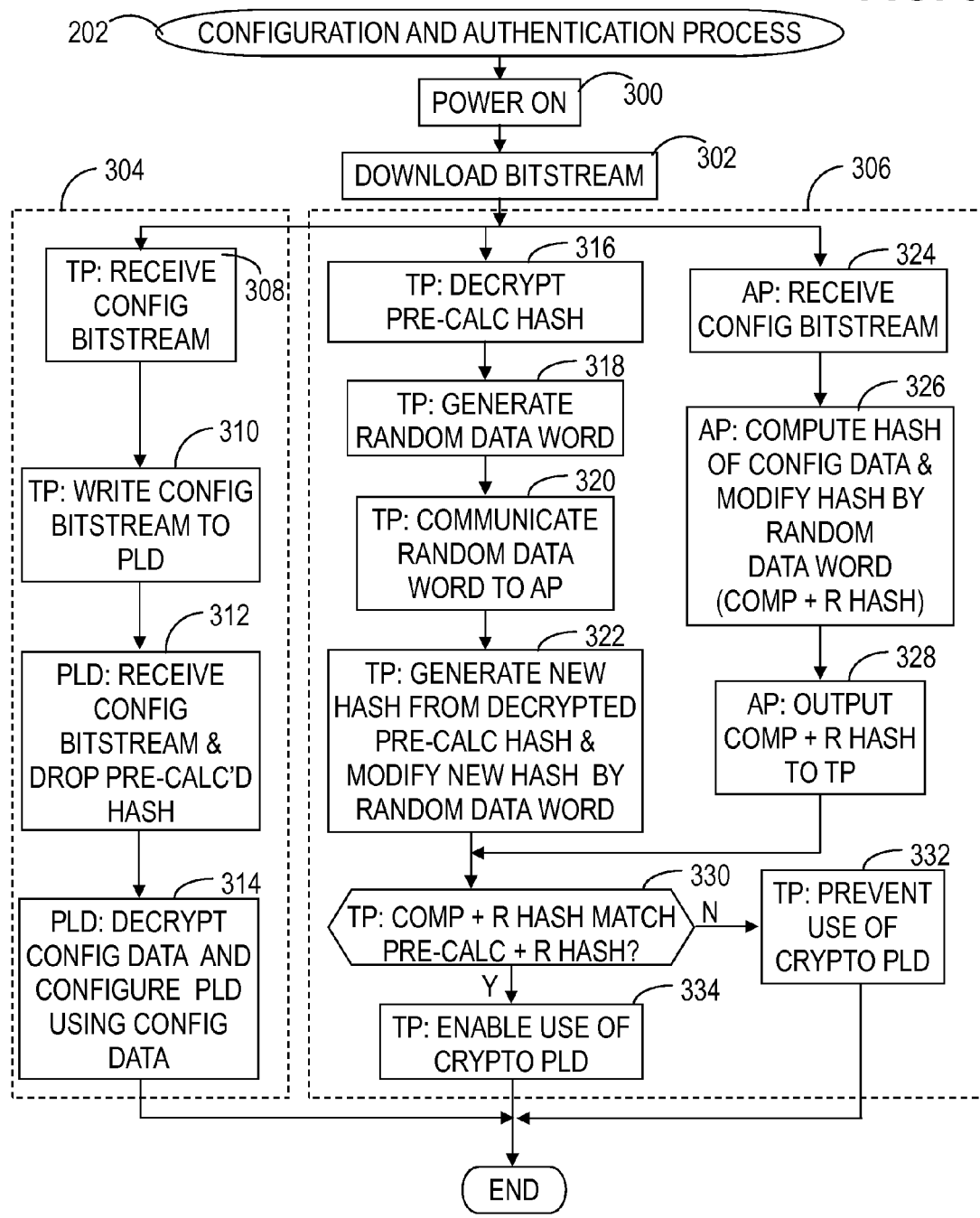
FIG. 3 shows a flowchart of a configuration and authentication process performed within the cryptographic system.
Figure 4:
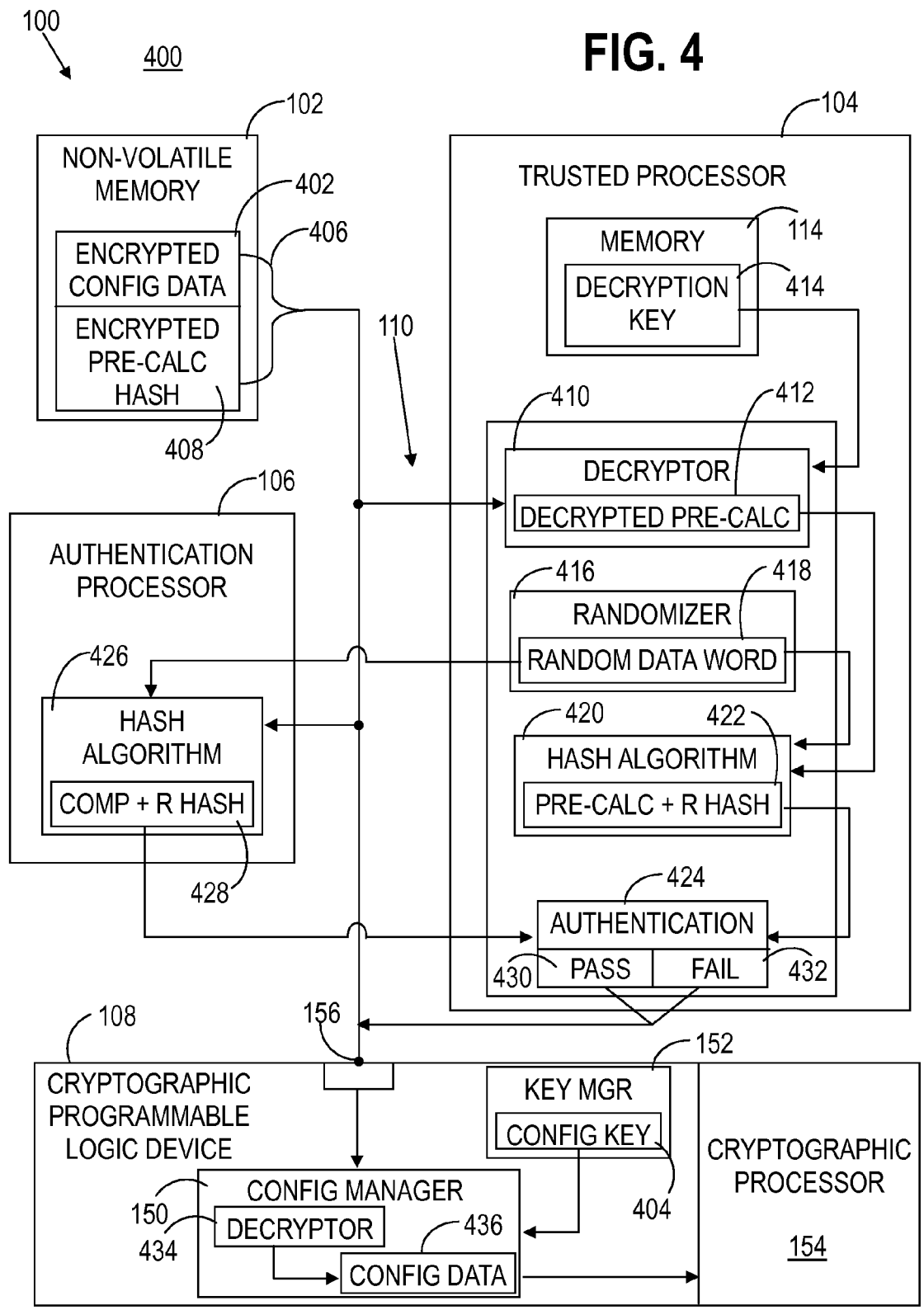
FIG. 4 shows a functional block diagram of the cryptographic system illustrating execution of the configuration and authentication process described in FIG. 3.

FIGS. 3 and 4

FIG. 3 shows a flowchart of configuration and authentication process 202 performed within cryptographic system 100, and FIG. 4 shows a functional block diagram 400 of cryptographic system 100 illustrating execution of configuration and authentication process 202 described in FIG. 3. Configuration and authentication process 202 is performed so that authentication of the configuration data used to configure PLD 108 is performed concurrent with configuration of cryptographic PLD at startup. Process 202 securely configures PLD 108 via trusted processor 104 using its built-in encrypted configuration data 402 stored in non-volatile memory 102 with a battery held-up configuration key 404 stored in association with, for example, key manager 152 of PLD 108. Storage of the encrypted configuration data 402 in non-volatile memory 102 that is accessible by trusted processor 104 provides a high speed approach to configuration and authentication, and enables an extensible updateable PLD design via NSA approved mechanisms as non-volatile memory 102 may be expanded to support multiple images.

Configuration and authentication process 202 begins with a task 300. At task 300, cryptographic system 100 is powered up. In response to power up of cryptographic system 100, process 202 is automatically performed.

Power up of cryptographic system 100 at task 300 results in the execution of a task 302. At task 302, a configuration bitstream 406 is downloaded from non-volatile memory 102 and conveyed to various components of cryptographic system 100 via bus 110. For example, upon power up, trusted processor 104 may read configuration bitstream 406 from memory 102 to initiate configuration and authentication. Configuration bitstream 406 includes encrypted configuration data 402 and a first hash value (PRE-CALC HASH) 408. In general, a hash value is a fixed-size string resulting from manipulation of an input via a cryptographic hash function. In this instance, an input to a cryptographic hash function is encrypted configuration data 402. The cryptographic hash function transforms encrypted configuration data 402 into first hash value 408 which is subsequently stored in non-volatile memory 102 with encrypted configuration data 402.

In response to task 302, a configuration subprocess 304 and an authentication subprocess 306 of configuration and authentication subprocess 202 are performed concurrently. Configuration subprocess 304 is performed to configure PLD 108, and concurrently, authentication subprocess 304 is performed to authenticate the configuration data used to configure PLD 108. Although subprocesses 304 and 306 are performed concurrently, configuration subprocess 304 will first largely be discussed, followed by discussion of authentication subprocess 306.

In response to the download of configuration bitstream 406 at task 302, configuration subprocess 304 proceeds with a task 308. At task 308, trusted processor (TP) 104 receives configuration bitstream 406 via bus 110.

Next, a task 310 of configuration subprocess 304 is performed. At task 310, trusted processor 104 writes configuration bitstream 406 to PLD 108 again via bus 110.

In response to task 310, a task 312 is performed. At task 312, PLD 108 receives configuration bitstream 406 and drops or otherwise ignores first hash value 408 appended to encrypted configuration data 402 and included in configuration bitstream 406.

Following task 312, configuration subprocess 304 continues with a task 314. At task 314, PLD 108 decrypts encrypted configuration data 402 from bitstream 406 received at configuration port 156 and PLD 108 is configured as a cryptographic PLD 108 using the configuration data of encrypted configuration data 402. In an embodiment, configuration manager 150 of PLD 108 implements a decryptor function 434 to decrypt encrypted configuration data 402 from bitstream 406 to obtain configuration data 436 that will be used to configure logic 149 (FIG. 1) to produce cryptographic processor 154. For example, configuration manager 150 may obtain configuration key 404 managed by key manager 152 that is suitable for decrypting encrypted configuration data 402 in order to obtain configuration data 436. Following task 314, configuration subprocess 304 is complete. However, configuration and authentication process 202 does not end until authentication subprocess 306 is also complete, as discussed below. Accordingly, concurrent with tasks 308, 310, 312, and 314 of configuration subprocess 304, authentication subprocess 306 is performed.

In response to the download of configuration bitstream 406 at task 302, authentication subprocess 306 proceeds with a number of parallel tasks that are performed at trusted processor 104 and authentication processor 106. These parallel tasks are represented by two columns of tasks within authentication subprocess 306. These tasks call for some interaction or exchange of information between trusted processor 104 and authentication processor 106. Thus, trusted processor 104 and authentication processor 106 operate together, or in concert, to cooperatively authenticate encrypted configuration data 402. Accordingly, the operations of the two illustrated columns may not be discussed serially. Rather, the operations are discussed in an order that is relevant to an exchange of information between processors 104 and 106.

It will be recalled that in response to the download of configuration bitstream 406 at task 302, trusted processor 104 receives configuration bitstream 406 via bus 110 in accordance with task 308. This task is not reproduced in association with authentication subprocess 306 since subprocesses 304 and 306 are performed concurrently. However, in response to receipt of configuration bitstream 406 at task 308, trusted processor executes a task 316.

At task 316, trusted processor 104 implements a decryptor function 410 to decrypt first hash 408 from configuration bitstream 406 to obtain an image 412 (DECRYPTED PRE-CALC) of encrypted configuration data 402. For example, trusted processor 104 may access a decryption key 414 stored in context memory 114 or other protected memory that is suitable for decrypting first hash 408.

Authentication subprocess 306 continues with a task 318. At task 318, trusted processor 104 implements a randomizer function 416 to generate a random data word 418. For example, randomizer function 416 may be an executable program or hardware element that generates random data word 418 in the form of, for example, a random number.

In response to task 318, trusted processor 104 performs a task 320 to communicate random data word 418 to authentication processor (AP) 106, as discussed below. In addition, trusted processor 104 performs a task 322.

At task 322, trusted processor 104 implements a hash algorithm 420 to generate a second hash value 422 (PRE-CALC+R HASH) from image 412 (DECRYPTED PRE-CALC) and modified by random data word 418. Second hash value 422 modified by random data word 418 is subsequently communicated to an authentication function 424, discussed below.

In response to the download of configuration bitstream 406 at task 302, a task 324 of authentication subprocess 306 is performed at authentication processor 106. At task 324, authentication processor 106 receives configuration data bitstream 406 via bus 110. Authentication processor 106 drops or otherwise ignores first hash value 408 appended to encrypted configuration data 402.

Next, authentication subprocess 306 continues at authentication processor 106 with a task 326. At task 326, authentication processor 106 implements a hash algorithm 426 and computes a third hash value 428 (COMP+R HASH) of the received encrypted configuration data 402 and modified by the random data word 418 received from trusted processor 104.

A task 328 is performed following task 326. At task 328, authentication processor 106 outputs third hash value 428 modified by random data word 418 to trusted processor 106. In particular, third hash value 428 modified by random data word 418 is subsequently communicated to authentication function 424 of trusted processor 104.

Authentication subprocess 306 continues with a query task 330. At query task 330, trusted processor 104 compares second hash value 422 modified by random data word 418 with third hash value 428 modified by random data word 418 to determine whether they match. More particularly, trusted processor 104 executes authentication function 424 to compare third hash value 428 with second hash value 422, both of which have been modified by random data word. Execution of authentication function 424 may yield either a pass decision 430 or a fail decision 432.

When query task 330 determines that fail decision 432 is produced in response to execution of authentication function 424, process control proceeds to a task 332. At task 332, trusted processor 104 prevents the further use of PLD 108. That is, encrypted configuration data 402 has not been authenticated. Accordingly, trusted processor 104 does not enable or otherwise authorize use of PLD 108 because authentication subprocess 306 has determined that data 402 is corrupt or otherwise compromised. Execution of task 332 to prevent use of PLD 108 may entail the output of an alarm condition, deconfiguration of PLD 108, and/or withholding of a traffic key (discussed below) to PLD 108. Following task 332, configuration and authentication process 202 exits without PLD 108 being authenticated for use to provide cryptographic services.

However, when query task 330 determines that pass decision is produced in response to execution of authentication function 424, process control proceeds to a task 334. At task 334, trusted processor 104 enables or otherwise authorizes use of PLD 108 for providing cryptographic services. Thus, the use of PLD 108 can only occur following successful authentication of encrypted configuration data 402.

In response to the concurrent execution of decrypting/configuration task 314 and authentication of encrypted configuration data 402 at task 334, configuration and authentication process 202 exits with PLD 108 having been configured, in this example, as cryptographic PLD 108. However, PLD 108 is not yet operable to provide cryptographic services. Rather, verification testing of cryptographic PLD 108 in accordance with functional verification process 204 must first be performed, as discussed below.

Figure 5:
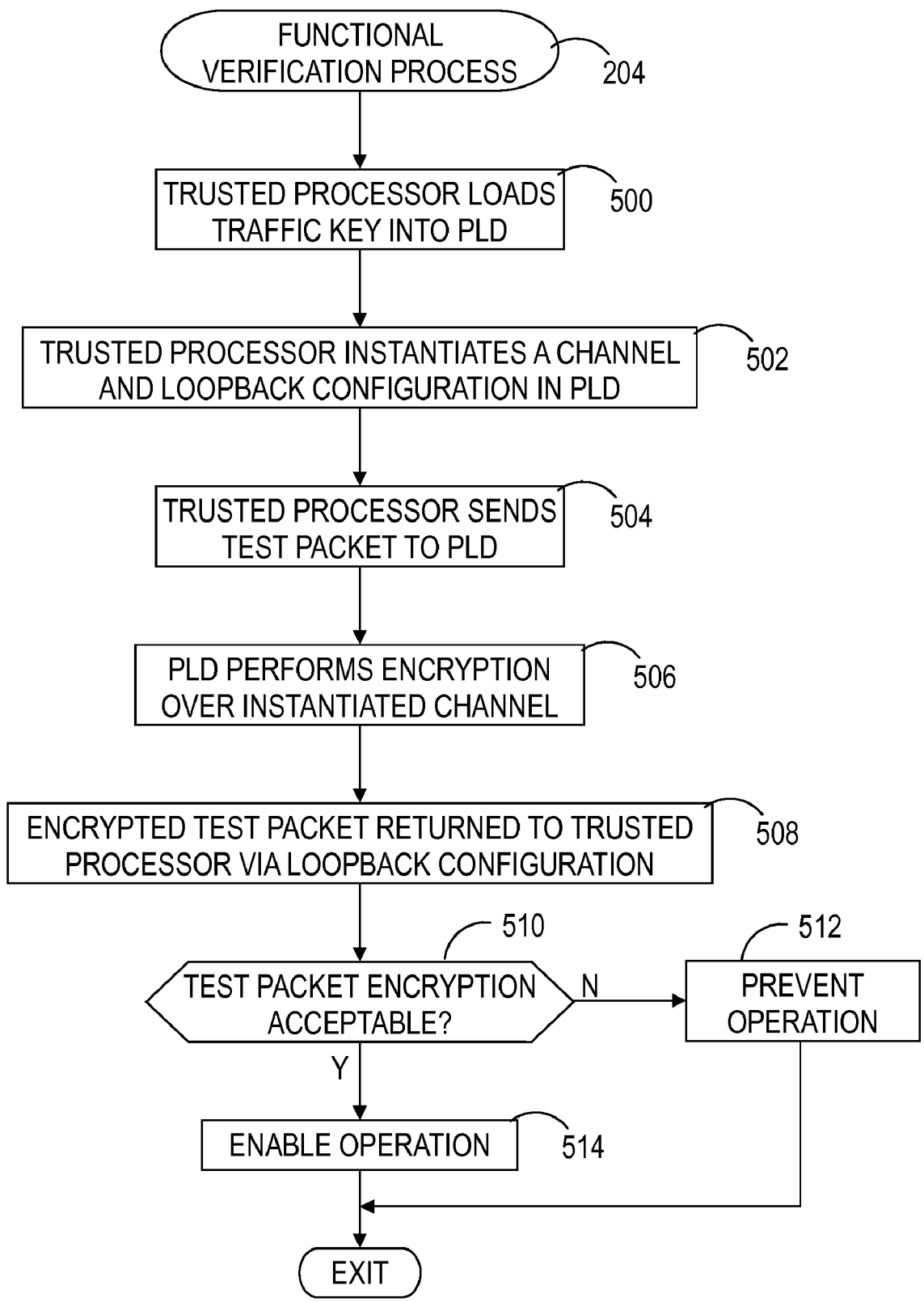
FIG. 5 shows a flowchart of a functional verification process performed within the cryptographic system.
Figure 6:
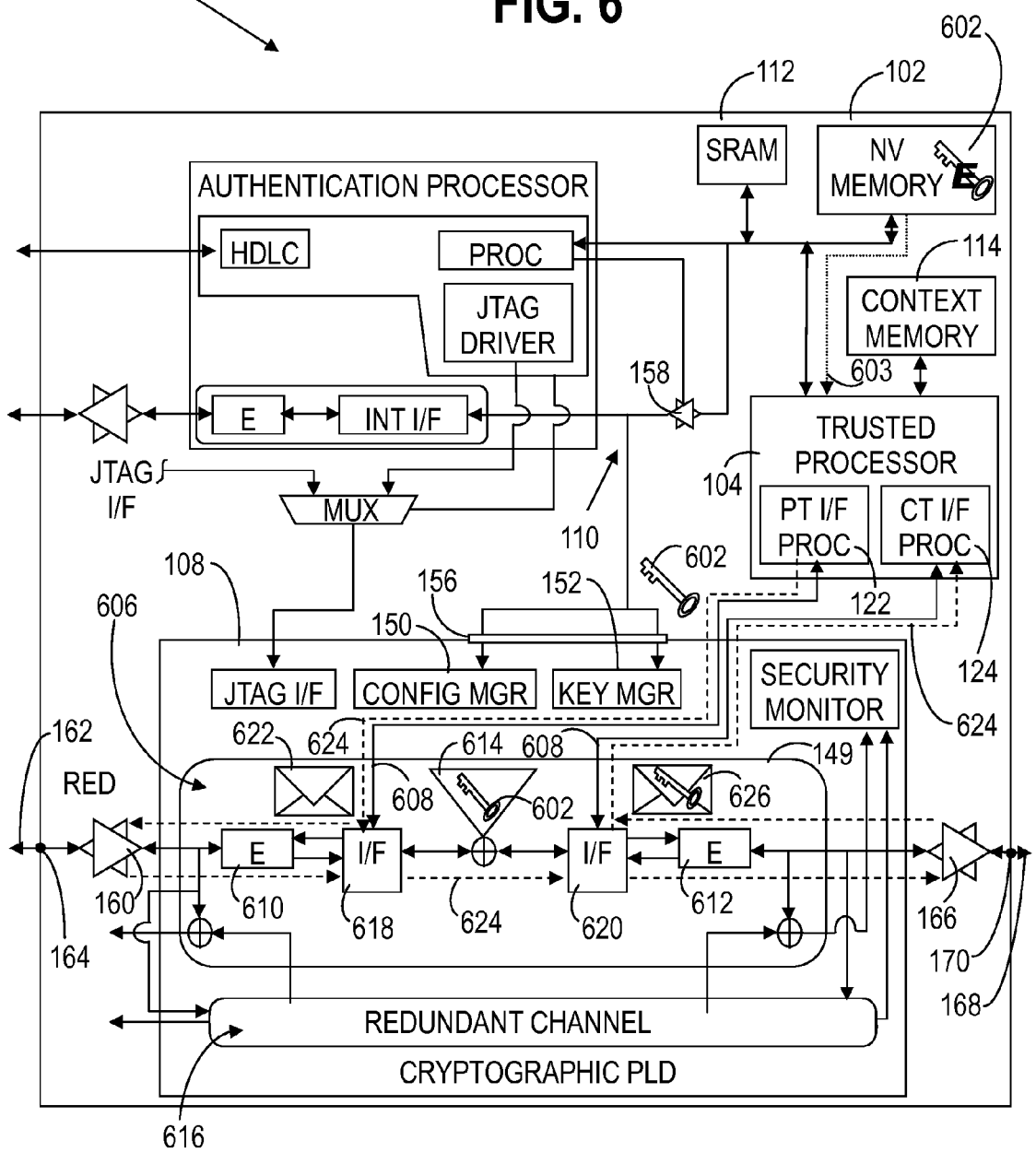
FIG. 6 shows a functional block diagram of the cryptographic system illustrating execution of the functional verification process described in FIG. 5.

FIGS. 5 and 6

FIG. 5 shows a flowchart of functional verification process 204 performed within cryptographic system 100, and FIG. 6 shows a functional block diagram 600 of cryptographic system 100 illustrating execution of functional verification process 204 described in FIG. 5. After encrypted configuration data 402 has been successfully authenticated and cryptographic PLD 108 has been configured through the execution of configuration and authentication process 202, functional verification process 204 is automatically executed. Functional verification process 204 is performed to verify the functionality of the configured cryptographic PLD 108. In addition, functional verification process 204 simultaneously exercises all high speed interfaces.

Functional verification process 204 begins with a task 500. At task 500, trusted processor 104 loads a traffic key 602 into cryptographic PLD 108. In cryptography, a key is a piece of information (i.e., a parameter) that determines the functional output of a cryptographic algorithm. Without a key, the algorithm would have no result. Traffic key 602 specifies the particular transformation of plain text 162 into cipher text 168 during encryption, or vice versa during decryption. Trusted processor 104 may retrieve and decrypt traffic key 602 from non-volatile memory 102, as represented by a dotted line 603. Trusted processor 104 can then provide traffic key 602 to key manager 152. In an embodiment, trusted processor 104 may provide traffic key 602 to key manager 152 in accordance with traffic key load process 208, discussed in detail in connection with FIGS. 9 and 10.

Following task 500, a task 502 is performed. At task 502, trusted processor 104 instantiates a channel 606 and a loopback configuration 608 in cryptographic PLD 108. Channel 606 is instantiated for encryption/decryption of plain text 162/cipher text 168. As such, channel 606 may generally include a plain text external interface (E) 610 in communication with transceiver 160 and a cipher text external interface (E) 612 in communication with transceiver 166 with an encryption/decryption function 614 interposed between interfaces 610 and 612. Instantiation of channel 606 further results in the loading of traffic key 602 to encryption/decryption function 168 by key manager 152. Instantiation of channel 606 at task 502 may further entail the instantiation of a redundant channel 616 capable of performing largely the same operations as channel 606. This redundancy will be discussed in connection with redundant system instantiation process 212, discussed in connection with FIGS. 13 and 14.

Loopback configuration 608 may generally include a plain text internal interface 618 interposed between plain text external interface 610 and encryption/decryption function 614, and a cipher text internal interface 620 interposed between cipher text external interface 612 and encryption/decryption function 614. Plain text internal interface 618 is in communication with plain text interface processor (PT I/F PROC) 122, as represented by an interconnecting line that forms a portion of loopback configuration 608. Likewise, cipher text internal interface 620 is in communication with cipher test interface processor (CT I/F PROC) 124, as represented by another interconnecting line that forms another portion of loopback configuration 608.

Following instantiation of channel 606 and loopback configuration 608 at task 502, functional verification process continues with a task 504. At task 504, trusted processor 104 sends a test packet 622 to cryptographic PLD 108 via plain text internal interface 618. Test packet 622 may be a known answer data packet. In accordance with the instantiated channel 606 and loopback configuration, packet 622 is conveyed through channel 606, as represented by a dashed line 624. As such, packet 622 is conveyed from plain text external interface 610 toward transceiver 160, i.e., a host interface. Test packet 622 is then communicated back through channel 606 and eventually through encryption/decryption function 614.

Accordingly, a task 506 is performed in connection with task 504. At task 506, test packet 622 is encrypted at encryption/decryption function 614 utilizing traffic key 602 to form an encrypted test packet 626.

In response to task 506, a task 508 is performed. At task 508, encrypted test packet 626 is returned to trusted processor 104 via loopback configuration 608. In particular, encrypted test packet 626 is conveyed to cipher text external interface 612 and transceiver 166, i.e., a host interface, where it is returned to cipher text internal interface 620. At cipher text internal interface 620, encrypted test packet 626 is returned to trusted processor 104 via cipher text interface processor (CT I/F PROC) 124.

Following receipt of encrypted test packet 626 at trusted processor 104, functional verification process 204 continues with a query task 510. At query task 510, trusted processor 104 determines whether encrypted test packet 626 is acceptable. For example, since test packet 622 is a known answer data packet, trusted processor 104 can readily verify whether encrypted test packet 626 was encrypted correctly.

When a determination is made at query task 510 that encrypted test packet 626 was encrypted incorrectly, i.e., test packet 626 is unacceptable, process control continues with a task 512. At task 512, trusted processor 104 disables operation of cryptographic PLD 108 and functional verification process 204 exits. However, when a determination is made at query task 510 that encrypted test packet 626 was encrypted correctly, i.e., test packet 626 is acceptable, process control continues with a task 514. At task 514, trusted processor 104 enables operation of cryptographic PLD 108 for providing cryptographic services and functional verification process 204 exits. Through the execution of functional verification process 204, in which channel 606 and loopback configuration 608 are instantiated and known test packets are encrypted, cryptographic verification testing can be performed while simultaneously exercising all external high-speed interfaces of channel 606.

Figure 7:
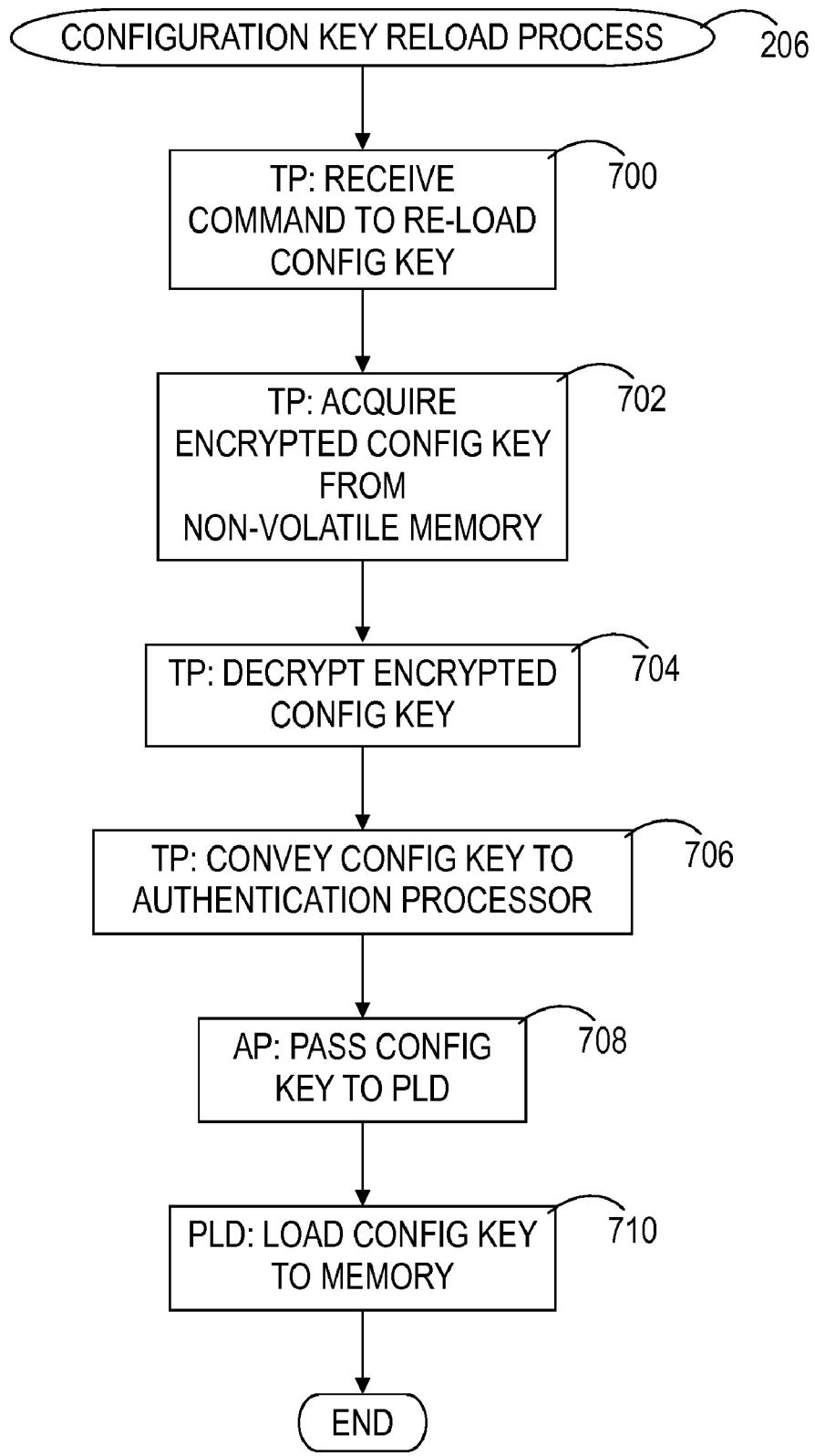
FIG. 7 shows a flowchart of a configuration key reload process performed within the cryptographic system.
Figure 8:
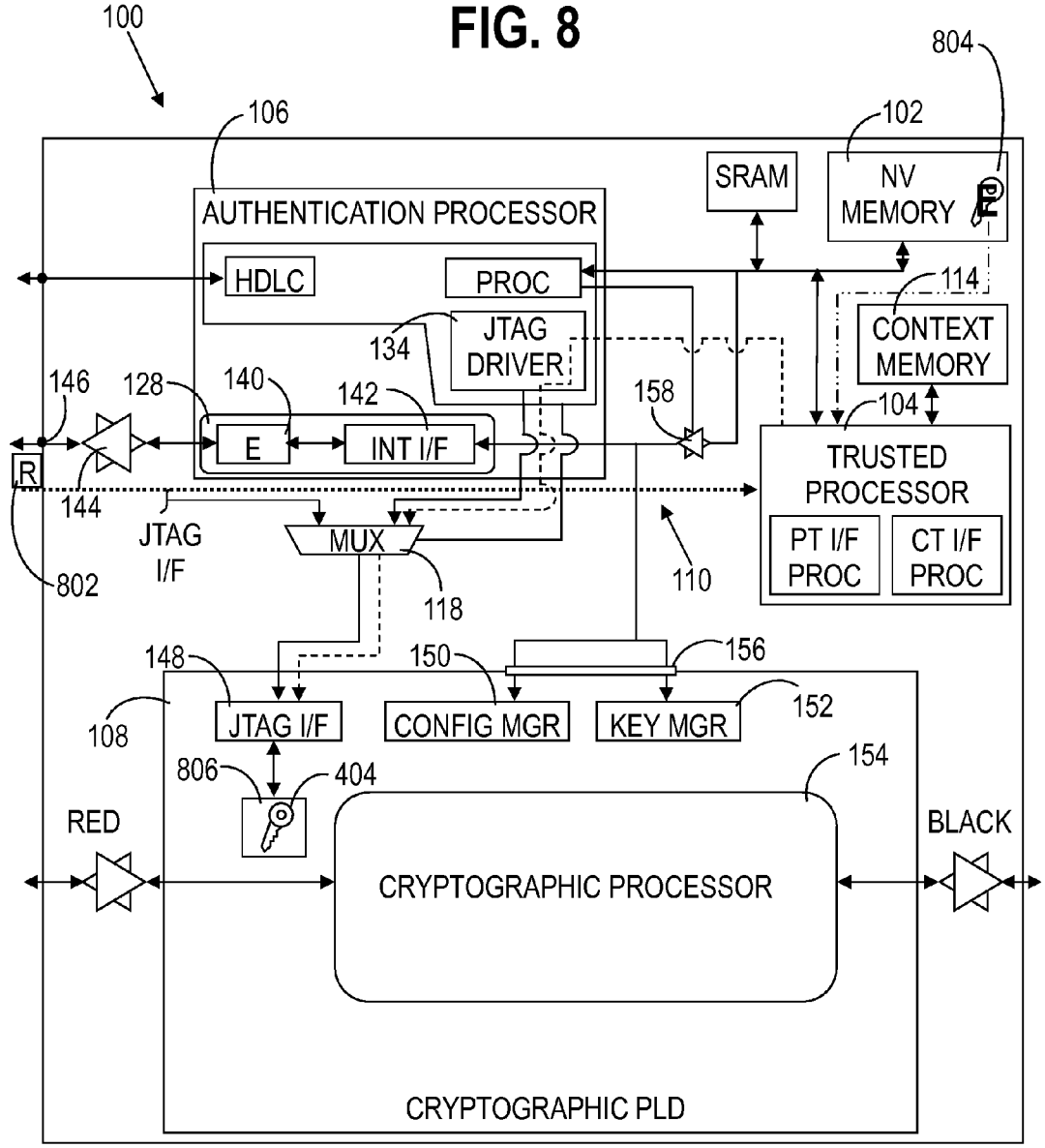
FIG. 8 shows a functional block diagram of the cryptographic system illustrating execution of the configuration key reload process described in FIG. 7.

FIGS. 7 and 8

FIG. 7 shows a flowchart of configuration key reload process 206 performed within cryptographic system 100, and FIG. 8 shows a functional block diagram 800 of cryptographic system 100 illustrating execution of configuration key reload process 206 described in FIG. 7. Configuration key 404 is held up by battery in a write-only location within cryptographic PLD 108. If configuration key 404 is lost, encrypted configuration data 402 cannot be decrypted to yield configuration data 436, and PLD 108 cannot be configured in accordance with configuration and authentication process 202. Accordingly, the secure mechanism of cryptographic system 100 includes configuration key reload process 206 for reloading configuration key 404.

Configuration key reload process 206 begins with a task 700. At task 700, trusted processor 104 receives a command to reload configuration key 404. By way of example, a reload command (R) 802 may be received at command port 146 where it is communicated to trusted processor 104 via second partition 128 of authentication processor 106 and bus 110.

In response to task 700, a task 702 is performed. At task 702, trusted processor 104 acquires an encrypted configuration key 804 from non-volatile memory 102.

Next, a task 704 is performed. At task 704, trusted processor 104 decrypts encrypted configuration key 804 to produce configuration key 404.

Following task 704, trusted processor 104 performs a task 706. At task 706, trusted processor 104 conveys configuration key 404 to JTAG driver 134 of authentication processor 106.

In response to task 706, a task 708 is performed. At task 708, authentication processor 106 passes configuration key 404 to JTAG/IF 148 of cryptographic PLD via multiplexer 118.

A task 710 is performed in response to task 708. At task 710, cryptographic PLD 108 loads configuration key 404 into battery held-up write only memory 806 associated with JTAG I/F 148. For example, configuration key 404 may be communicated from JTAG interface 148 to memory 806 via communication links built into cryptographic PLD 108.

Following task 710, configuration key reload process 206 exits having securely loaded configuration key 404 to cryptographic PLD 108 via a communication port, e.g. JTAG driver 134, multiplexer 118, and JTAG I/F 148 that is separate from configuration port 156 used for the communication of encrypted configuration data 402 to cryptographic PLD 108.

Figure 9:
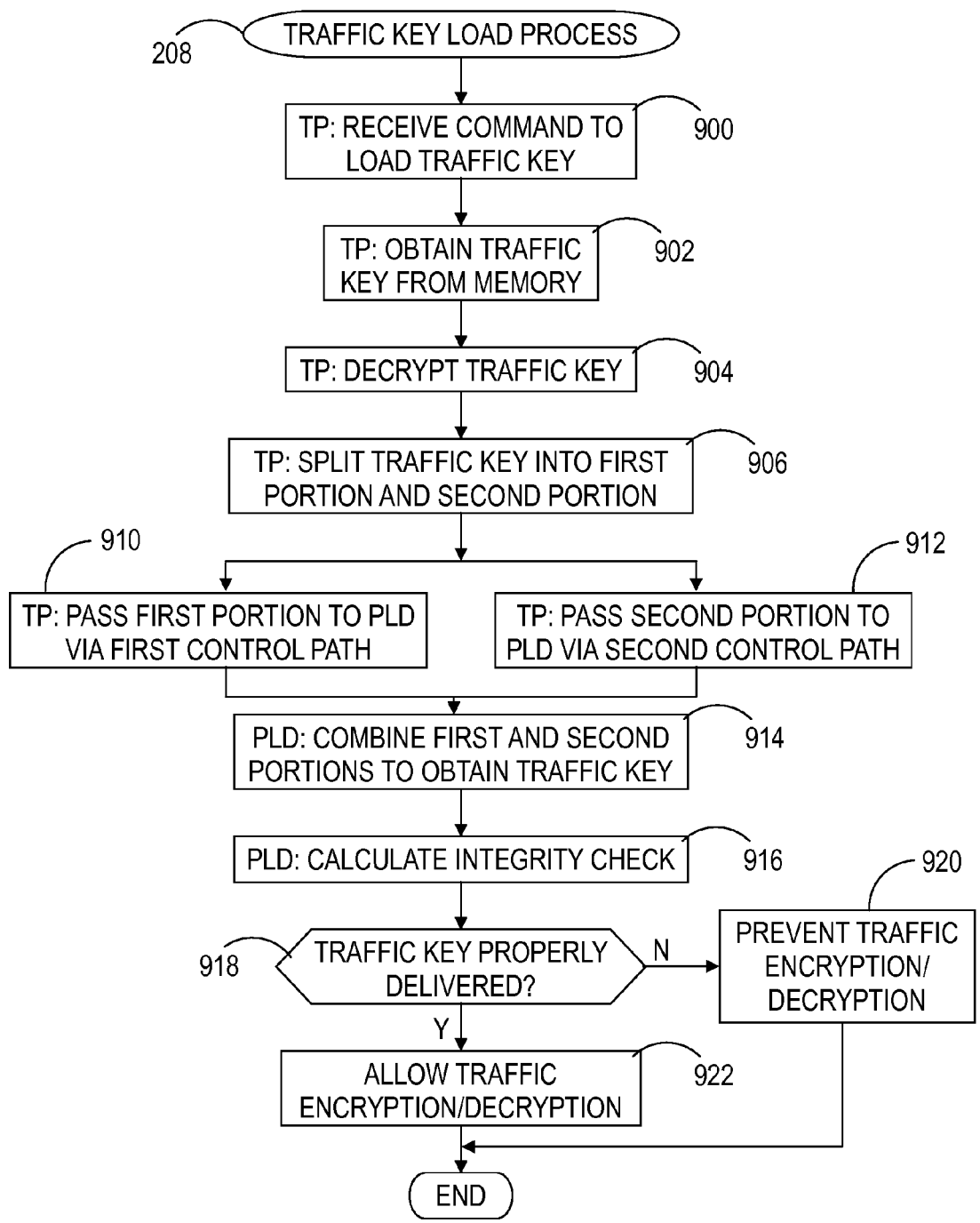
FIG. 9 shows a flowchart of a traffic key load process performed within the cryptographic system.

FIGS. 9 and 10

FIG. 9 shows a flowchart of traffic key load process 208 performed within cryptographic system 100, and FIG. 10 shows a functional block diagram 1000 of cryptographic system 100 illustrating execution of traffic key load process 208 described in FIG. 9. The secure mechanism of cryptographic system 100 includes a capability, exemplified by traffic key load process 208, for loading traffic key 602 to cryptographic PLD 108.

Traffic key load process 208 begins with a task 900. At task 900, trusted processor 104 receives a command to load traffic key 602 to cryptographic PLD in order to perform cryptographic services. By way of example, a load command (L) 1002 may be received at command port 146 where it is communicated to trusted processor 104 via second partition 128 of authentication processor 106 and bus 110.

In response to task 900, a task 902 is performed. At task 902, trusted processor 104 acquires an encrypted traffic key 1004 from non-volatile memory 102, as represented by a dash-dot line 1006 between memory 102 and trusted processor 104.

Next, a task 904 is performed. At task 904, trusted processor 104 decrypts encrypted traffic key 1004 to produce traffic key 602.

Following decryption of encrypted traffic key 1004 at task 904 to yield traffic key 602, a task 906 is performed. At task 906, trusted processor 104 splits traffic key 602 into a first portion 1008 and a second portion 1010. Various methodologies may be employed to split traffic key 602 into first and second portions 1008 and 1010. For example, since traffic key 602 has some mathematical structure, it may be split using a mathematical algorithm. In one embodiment, traffic key 602 may be split and combined with random data using an exclusive or function. Traffic key 602 is split into first and second portions 1008 and 1010 so that should an attacker acquire one of portions 1008 and 1010 it would not be possible to reconstruct traffic key 602.

Following task 906, concurrent operations 910 and 912 are performed. At task 910, trusted processor 104 passes first portion 1008 of traffic key 602 to cryptographic PLD 108 via a first control path 1012. In this example, first control path 1012 is formed between cipher text interface processor (CT I/F PROC) 124 of trusted processor 104 and cipher text internal interface 620 of cryptographic PLD 108. First portion 1008 of traffic key 602 is subsequently written to key manager 152.

At task 912, trusted processor 104 passes second portion 1010 of traffic key 602 to cryptographic PLD via a second control path 1014. In this example, second control path 1014 is formed between trusted processor and configuration port 156 via communication bus 110. Second portion 1010 of traffic key 602 is subsequently received at configuration port 156 and is written to key manager 152.

Following execution of tasks 910 and 912, a task 914 is performed. At task 914, cryptographic PLD 108 combines first and second portions 1008 and 1010, respectively, to obtain traffic key 602. For example, cryptographic PLD 108 combines the first and second portions 1008 and 1010 and the random data generated through the exclusive or function of task 906 to recreate traffic key 602.

A task 916 is performed in response to task 914. At task 916, key manager 152 of cryptographic PLD 108 calculates an integrity check value of traffic key 602. In an embodiment, cryptographic PLD 108 calculates a Frame Check Sequence (FCS) value on traffic key 602. Cryptographic PLD 108 then returns the calculated integrity check value to trusted processor 104 via, for example, communication bus 110.

Upon receipt of the calculated integrity check value, a query task 918 is performed. At query task 918, trusted processor 104 determines whether the received integrity check value indicates that transfer and recreation of traffic key 602 was performed correctly. For example, cryptographic PLD 108 may calculate the integrity check value on traffic key 602 and return the integrity check value to trusted processor 104. Trusted processor 104 then computes an integrity check value on traffic key 602 using the same algorithm and compares it to the received integrity check value. In this way, trusted processor 104 can determine whether any data was lost or altered in transit or during recreation of traffic key 602.

When a determination is made at query task 918 that traffic key 602 was not properly delivered, traffic key load process 208 proceeds to a task 920. At task 920, encryption/decryption of traffic via channel 606 is prevented. Following task 920, traffic key load process 208 exits without channel 606 and the use of traffic key 602 being enabled since the integrity of traffic key 602 could not be verified.

When a determination is made at query task 918 that traffic key 602 was properly delivered, traffic key load process 208 proceeds to a task 922. At task 922, encryption/decryption of traffic via channel 606 is allowed. That is, trusted processor 104 may write to configuration manager 150 of cryptographic PLD 108 to enable channel 606 and the use of traffic key 602. Following task 922, traffic key load process 208 exits.

Figure 11:
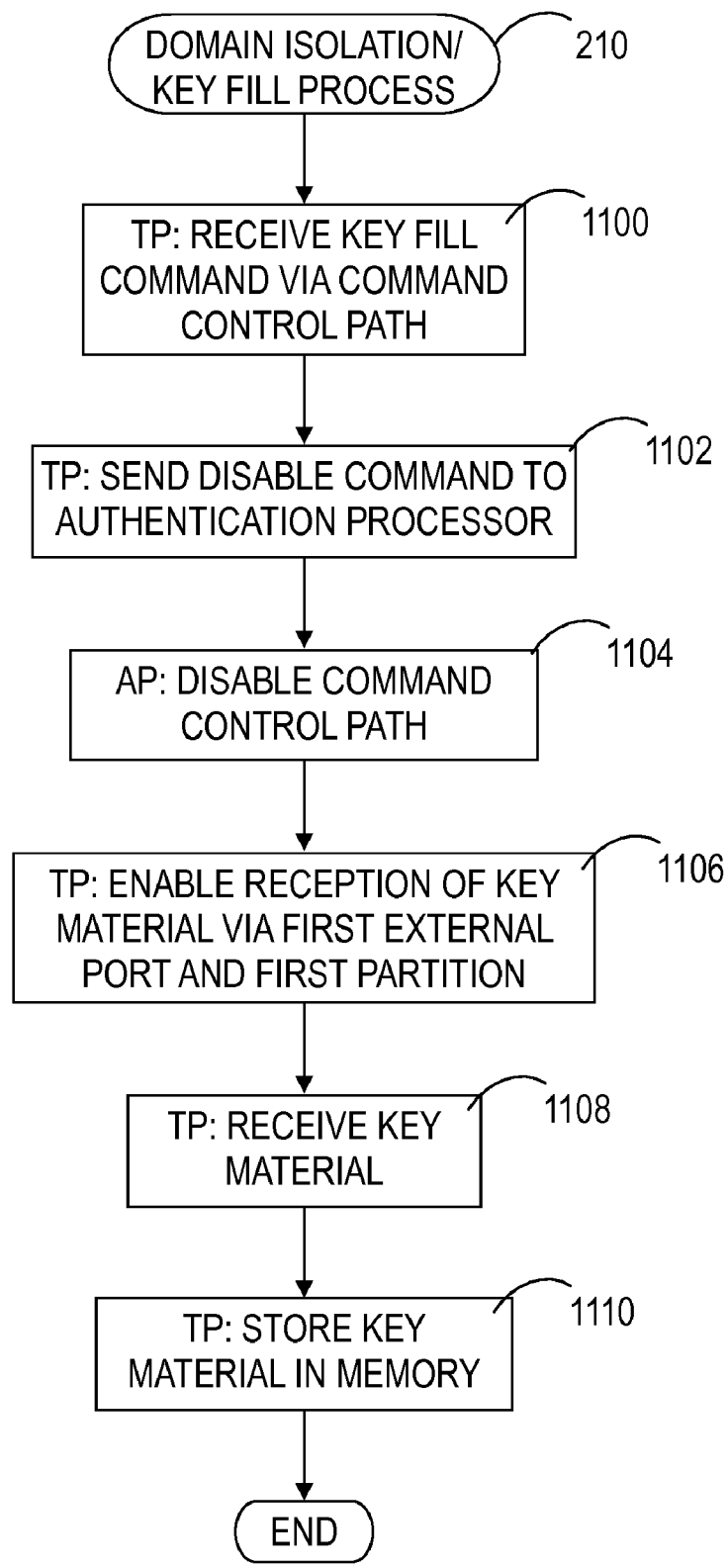
FIG. 11 shows a flowchart of a domain isolation/key fill process performed within the cryptographic system.
Figure 12:
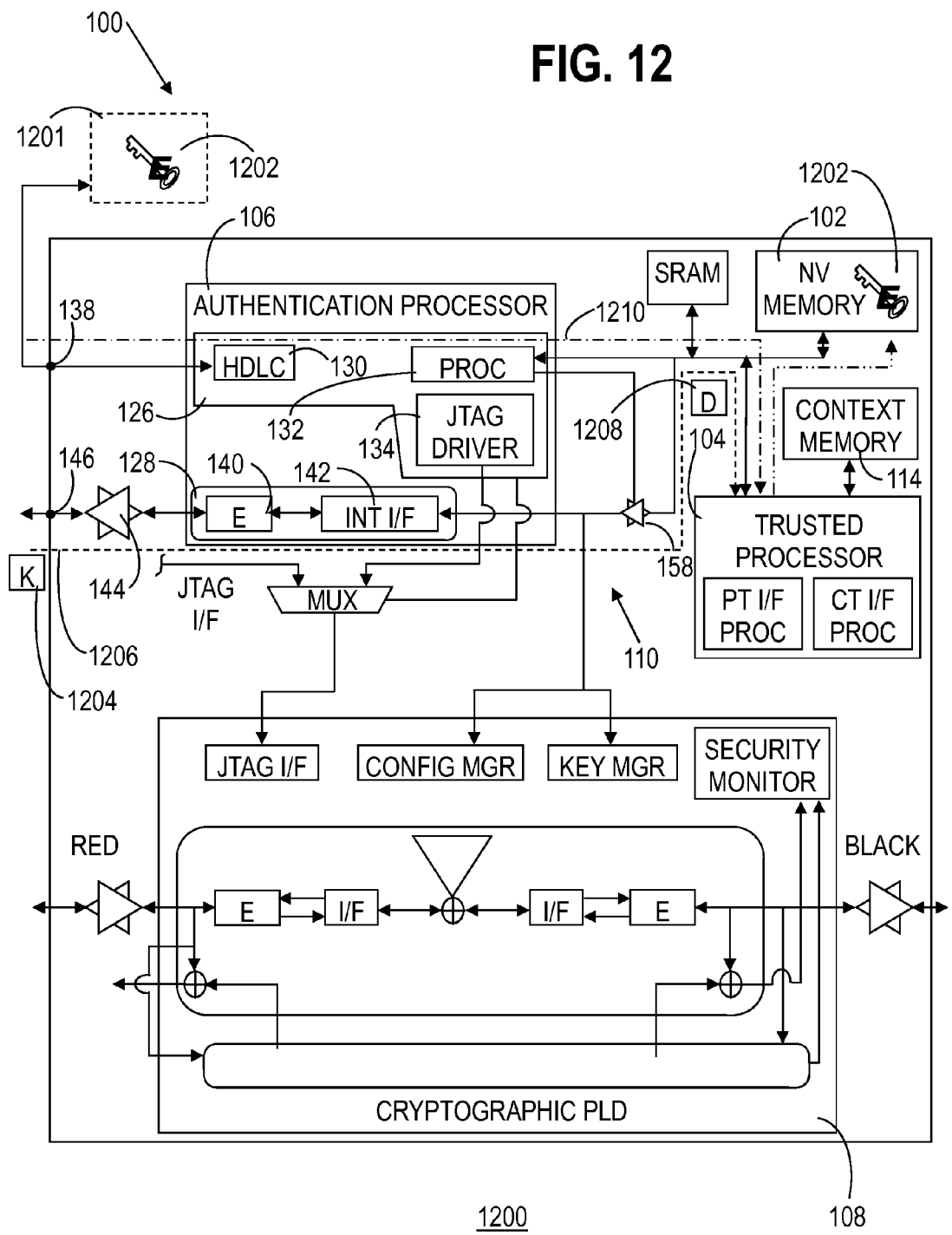
FIG. 12 shows a functional block diagram of the cryptographic system illustrating execution of the domain isolation/key fill process described in FIG. 11.

FIGS. 11 and 12

FIG. 11 shows a flowchart of domain isolation/key fill process 210 performed within cryptographic system 100, and FIG. 12 shows a functional block diagram 1200 of cryptographic system 100 illustrating execution of domain isolation/key fill process 210 described in FIG. 11. The secure mechanism of cryptographic system 100 includes capability for isolating different domains, e.g., control, data, and key fill domains. By securely applying bus isolation techniques, these domains can be separated from one another to meet National Security Agency requirements. FIGS. 11 and 12 provide an example of isolation of key fill and control domains within cryptographic system 100. Key fill pertains to the loading of configuration key 404, traffic key 602, and/or a key encryption key from a key fill source 1201 via external port 138. As such, execution of domain isolation/key fill process 210 results in the loading of encrypted or unencrypted key material 1202. The term "key material 1202" is used herein to refer to any of configuration key 404, traffic key 602, or a key encryption key (KEK) typically used to protect other keys.

Domain isolation/key fill process 210 begins with a task 1100. At task 1110, trusted processor 104 receives a command to enable key fill. By way of example, a key fill command (K) 1204 may be received at command port 146 where it is passed to trusted processor 104 via a command control data path 1206 on second partition 128 of authentication processor 106 and bus 110. Command control data path 1206 for key fill command 1204 goes through, for example, command port 146, transceiver 144, external interface 140 and internal interface 142 of second partition 128, bus 110, and transceiver 158 to trusted processor 104.

In response to receipt of key fill command 1204, a task 1102 is performed. A task 1102, trusted processor 104 sends a command to authentication processor 106 to disable command control path 1206. By way of example, trusted processor 104 sends a disable command (D) 1208 to authentication processor 106 to disable command control path 1206 on second partition 128.

In response to receipt of disable command 1208, a task 1104 is performed. At task 1104, authentication processor 106 disables command control path 1206. In an embodiment, authentication processor 106 disables command control path 1206 by disabling transceiver 158 which provides a path to trusted processor 104 via second partition 128 of authentication processor 106.

Following disabling of command control path 1206 at task 1104, a task 1106 is performed. At task 1106, trusted processor 104 enables reception of encrypted key material 1202 from key fill source 1201 via external port 138 and first partition 126. A key fill data path 1210 for key material 1202 goes through, for example, external port 138, HDLC 130 of first partition 126, bus 110, and transceiver 158 to trusted processor 104.

A task 1108 is performed in conjunction with task 1106. At task 1106, trusted processor 104 receives encrypted key material 1202.

Next, a task 1110 is performed. At task 1110, trusted processor 104 stores encrypted key material 1202 (such as configuration key 404 or traffic key 602) in non-volatile memory 102. If key material 1202 is the unencrypted key encryption key, key material 1202 may be stored in protected memory (e.g., context memory 114 or other suitable memory) associated with trusted processor 104. Following task 1110, process 210 exits.

FIGS. 13 and 14

FIG. 13 shows a flowchart of redundant system instantiation process 212, and FIG. 14 shows a functional block diagram of a portion of cryptographic system 100 illustrating execution of redundant system instantiation process 212. The secure mechanism of cryptographic system 100 can include a capability to isolate different data domain regions within cryptographic PLD 108. In addition, the secure mechanism of cryptographic system 100 provides methodology to assuredly compare the two regions against one another for proper operation and at high speed.

Redundant system instantiation process 212 begins at a task 1300. At task 1300, trusted processor 104 instantiates channel 606, referred to hereinafter as a first channel 1400. First channel 1400 is instantiated at a first region 1402 of configurable logic 149.

A task 1302 is performed in connection with task 1300. At task 1302, trusted processor 104 further instantiates redundant channel 616, referred to hereinafter as a second channel 1404. Second channel 1404 is instantiated at a second region 1406 of configurable logic 149 which is isolated from first region 1402.

Next, a task 1304 is performed. At task 1304, a comparator 1408 is configured. In this example, instantiation of channels 1400 and 1404 and configuration of comparator 1408 entails establishing a communication pathway 1410 between transceiver 166 and cipher text external interface 612 of first channel 1402, a communication pathway 1412 from pathway 1410 to an input of comparator 1408, and a communication pathway 1414 from pathway 1410 to a cipher text interface (not shown) of second channel 1404. Configuration of comparator 1408 further entails establishing a communication pathway 1416 between second channel 1404 and an input of comparator 1408. In addition, configuration of comparator 1408 can entail establishing another communication pathway 1418 from an output of comparator 1408 to a security monitor 1420 on cryptographic PLD 108 and a communication pathway 1422 from an output of second channel 1404 to security monitor 1420. In such a configuration, cipher text 168 of the incoming plain text 162 that is produced through the cryptographic services of first and second channels 1400 and 1404 can be input into comparator 1408 for comparison.

Next, a task 1306 is performed. At task 1306, another comparator 1424 is configured. In this example, instantiation of channels 1400 and 1404 and configuration of comparator 1424 entails establishing a communication pathway 1426 between transceiver 160 and plain text external interface 610 of first channel 1402, a communication pathway 1428 from pathway 1426 to an input of comparator 1426, and a communication pathway 1430 from pathway 1426 to a plain text interface (not shown) of second channel 1404. Configuration of comparator 1424 further entails establishing a communication pathway 1432 between second channel 1404 and an input of comparator 1424. Additional, communication pathways may include a communication pathway 1434 at an output of comparator 1424 and a communication pathway 1436 at an output of a plain text side of second channel 1404 to security monitor 1420. In such a configuration, plain text 162 of the incoming cipher text 168 that is produced through the cryptographic services of first and second channels 1400 and 1404 can be input into comparator 1424 for comparison. Following task 1306, redundant system instantiation process 212 exits.

FIG. 15

FIG. 15 shows a flowchart of cryptographic services process 214 executed within cryptographic system 100. Cryptographic services process 214 is discussed in connection with encrypting plain text 162 received at red port 164 in order to produce cipher text 168 for output at black port 170. Those skilled in the art will readily recognize, however, that cryptographic services may be provided through the execution of process 214 to decrypt cipher text 168 received at black port 170 in order to produce plain text 162 for output at red port 164.

Cryptographic services process 210 begins with a task 1500. At task 1500, a first signal, in this example, plain text 162 is received at first and second encryption channels 1400 and 1404. More specifically, cryptographic system 100 receives plain text 162 at red port 164 and through transceiver 160 where it is communicated to first encryption channel 1400 via communication pathway 1426 and where it is communicated to second encryption channel 1404 via communication pathways 1426 and 1430.

In response to task 1500, a task 1508 is performed. At task 1508, cryptographic services are performed at first and second encryption channels 1400 and 1402, respectively, to produce a second signal. In this example, the cryptographic services entail encryption of plain text 162 to produce the second signal, i.e., cipher text 168.

In response to task 1508, a task 1510 is executed. At task 1510, cipher text 168 is routed from first encryption channel 1400 via communication pathways 1410 and 1412 to comparator 1408. In addition, cipher text 168 is routed from second encryption channel 1404 to comparator 1408 via communication pathway 1416.

Cryptographic services process 214 continues with a query task 1512. At query task 1512, comparator 1408 determines whether cipher text 168 from each of first and second encryption channels 1400 and 1404 matches. Cipher text 168 may not match if either of encryption channels 1400 and 1404 has been tampered with or otherwise corrupted by an adversary, or if a hardware or configuration fault has occurred.

When cipher text 168 from each of first and second encryption channels 1400 and 1404 does not match, process control proceeds to task 1506. At task 1506, cryptographic services are discontinued and cryptographic services process 214 ends. Execution of task 1506 may result in the communication of a mis-match indicator to security monitor 1420 via communication pathways 1418 and 1422.

When cipher text 168 from each of first and second encryption channels 1400 and 1414 matches, process control continues with a task 1514. At task 1514, cryptographic services are continued. For example, cipher text 168 may be output via transceiver 166 and black port 170. Following task 1514, cryptographic services process 214 exits.

The methodology of cryptographic services process 214 creates an analyzable pass-through region utilizing comparators 1408 and 1424 so that an evaluator can be assured that both exiting signals (e.g., plain text 162 or cipher text 168) from channels 1400 and 1404 have been sourced by the same incoming signal (e.g., cipher text 168 or plain text 162). This assures an evaluator of the integrity of the signals to be compared in the redundant first and second regions 1402 and 1406, respectively. By forming the redundant first and second regions 1402 and 1406, as well as comparators 1408 and 1424, on cryptographic PLD 108, the signals need not be passed off-chip so that the comparison can be performed at higher speeds then that occurring when the signals are passed off-chip. Moreover, dual fault immunity is achieved without waiting for a check via security monitor 1420.

In summary, the present invention teaches of a configurable system and configuration methodology for enabling a cryptographic programmable logic device (PLD). The secure mechanism of the configurable system and configuration methodology provide the functions of trusted configuration and authentication, functional verification of the configured circuit design, reloading of internal (i.e., configuration) keys, loading of operational (i.e., traffic) keys, isolation of key and control flow domains, and comparison of internal redundant physical regions for proper operations.

The configuration and authentication process of the secure mechanism securely configures the PLD using its built-in AES encryption/decryption algorithm with a battery held up configuration data key via a trusted processor. Storing the PLD configuration data in a location accessible to the trusted processor allows for an extensible updateable PLD design via NSA approved mechanisms. The functional verification process of the secure mechanism verifies the cryptographic functionality of the configured PLD and of its external interfaces adding higher assurance to the PLD design after configuration data stream loading. The configuration key reload process of the secure mechanism supports configuration key reloading to allow for recovery of the key in the event of hold up battery loss. The traffic key load process of the secure mechanism enables the transfer of traffic keys into the configured PLD from the trusted processor to allow for cryptographic services in the PLD. The traffic key load process employs a method of splitting these keys to remove risk of emanations associated with an unencrypted key transfer. The domain isolation/key fill process of the secure mechanism achieves isolation of key fill paths from control paths to allow for key loading and maintaining adequate isolation in accordance with NSA requirements. In addition, the redundant system instantiation process of the secure mechanism enables optimized high speed comparison of redundant isolation regions within the PLD when providing cryptographic services. Accordingly, the system and methodology enable the use of a single PLD for secure operation, meeting National Security Agency (NSA) Type 1 certification rules.

Although the preferred embodiments of the invention have been illustrated and described in detail, it will be readily apparent to those skilled in the art that various modifications may be made therein without departing from the spirit of the invention or from the scope of the appended claims. For example, depending upon desired cryptographic security, a cryptographic system may be adapted to execute various ones of the processes of the secure mechanism. Furthermore, the process steps discussed herein can take on great number of variations and can be performed in a differing order then that which was presented.

What is claimed is:

1. A method for secure configuration of a programmable logic device (PLD) comprising:
conveying a bitstream from memory to each of a trusted processor, an authentication processor, and said PLD, said bitstream including encrypted configuration data;
cooperatively authenticating said encrypted configuration data using said authentication processor and said trusted processor;
decrypting, at said PLD, said encrypted configuration data included in said bitstream to obtain configuration data;
configuring said PLD using said configuration data, said decrypting and configuring operations occurring concurrent with said authenticating operation; and
enabling use of said PLD as a configured PLD when said authentication operation authenticates said encrypted configuration data.

2. A method as claimed in claim 1 further comprising preventing use of said PLD as said configured PLD when authentication operation fails to authenticate said encrypted configuration data.

3. A method as claimed in claim 1 wherein said bitstream further includes a first hash value of said encrypted configuration data, and said cooperatively authenticating comprises:
decrypting, at said trusted processor, said first hash value to obtain an image of said encrypted configuration data;
generating, at said trusted processor, a random data word;
computing, at said trusted processor, a second hash value of said image of said encrypted configuration data modified by said random data word;
computing, at said authentication processor, a third hash value of said encrypted configuration data modified by said random data word; and
comparing said third hash value with said second hash value, such that said encrypted configuration data is authenticated when said third hash value matches said second hash value and said encrypted configuration data is unauthenticated when said third hash value fails to match said second hash value.

4. A method as claimed in claim 1 wherein said configured PLD is a cryptographic PLD and said method further comprises:
instantiating an encryption channel and loopback configuration in said cryptographic PLD to said trusted processor;
communicating a test packet from said trusted processor to said encryption channel;
receiving, at said trusted processor, an encrypted test packet from said cryptographic PLD via said loopback configuration;
determining, at said trusted processor an integrity of said encrypted test packet; and
when said integrity of said encrypted test packet is acceptable, enabling operation of said cryptographic PLD for providing cryptographic services.

5. A method as claimed in claim 4 further comprising:
loading an encryption key from said trusted processor to said cryptographic PLD prior to said instantiating operation; and
encrypting, at said cryptographic PLD, said test packet via said encryption channel using said encryption key.

6. A method as claimed in claim 4 wherein when said integrity of said encrypted test packet is unacceptable disabling operation of said cryptographic PLD.

7. A method as claimed in claim 4 wherein:
said instantiating operation comprises:
establishing said encryption channel between an insecure external interface and a secure external interface; and
forming said loopback configuration to include an output interface between said trusted processor and said insecure external interface and a return interface between said secure external interface and said trusted processor; and
said communicating operation comprises routing said test packet from said trusted processor toward said insecure external interface via said output interface, over said encryption channel for encryption, and over said secure external interface for communication of said encrypted test packet to said trusted processor via said return interface.

8. A method as claimed in claim 1 wherein said bitstream is received at said PLD via a first interface, and said method further comprises:
acquiring, at said trusted processor, an encrypted key from said memory;
decrypting said encrypted key at said trusted processor to produce a configuration key;
conveying said configuration key from said trusted processor to said authentication processor; and
forwarding said configuration key from said authentication processor to said PLD for use at said PLD, said forwarding occurring via a second interface interconnecting said authentication processor with said PLD.

9. A method as claimed in claim 1 wherein said configured PLD is a cryptographic PLD and said method further comprises:
obtaining, at said trusted processor, a first portion and a second portion of a traffic key;
communicating said first portion of said traffic key to said cryptographic PLD via a first interface;
communicating said second portion of said traffic key to said cryptographic PLD via a second interface, said second interface differing from said first interface;
combining said first and second portions at said cryptographic PLD to form said traffic key; and
implementing said traffic key in said cryptographic PLD to provide cryptographic services.

10. A method as claimed in claim 9 wherein an encrypted image of said traffic key is stored in memory, and said obtaining operation comprises:
conveying said encrypted image to said trusted processor from said memory;
decrypting said encrypted image at said trusted processor to obtain said traffic key; and
splitting said traffic key into said first and second portions at said trusted processor, said first portion of said traffic key being distinct from said second portion of said traffic key.

11. A method as claimed in claim 9 further comprising:
performing an integrity check of said traffic key at said cryptographic PLD prior to said implementing operation to obtain an integrity result;
returning said integrity result to said trusted processor;
performing said implementing operation when said integrity result confirms a proper delivery of said traffic key; and
preventing said implementing operation when said integrity result indicates an improper delivery of said traffic key.

12. A method as claimed in claim 1 further comprising:
receiving, at said trusted processor, key material via an external port;
communicating said key material from said trusted processor for storage in said memory;
conveying said key material from said memory to said PLD; and
implementing said key material in said PLD.

13. A method as claimed in claim 12 wherein said key material includes at least one of a configuration key for decrypting said encrypted configuration data, configuring said PLD, a traffic key for enabling said configured PLD to provide cryptographic services, and a key encryption key.

14. A method as claimed in claim 12 wherein said external port is a first external port, said authentication processor includes a first partition coupled with said first external port and a second partition coupled with a second external port, said second partition being separate from said first partition, and said method further comprises:
establishing a command control path between said second external port and said trusted processor via said second partition;
receiving a key fill command at said trusted processor via said command control path;
disabling said command control path in response to said key fill command; and
enabling receipt of said key material at said trusted processor via said first external port and said first partition following said disabling operation.

15. A method as claimed in claim 1 wherein said configured PLD is a cryptographic PLD and said method further comprises:
instantiating a first cryptographic channel at a first region of said cryptographic PLD;
instantiating a second cryptographic channel at a second region of said cryptographic PLD;
providing a first signal to each of said first and second cryptographic channels;
utilizing cryptographic services at each of said first and second cryptographic channels to convert said first signal to produce a second signal; and
verifying conversion of said first signal to said second signal at each of said first and second cryptographic channels.

16. A method as claimed in claim 15 wherein said verifying conversion comprises:
routing said second signal produced by said each of said first and second cryptographic channels to a second comparator configured on said cryptographic PLD and isolated from said first and second regions; and
comparing said second signal produced by said each of said first and second cryptographic channels at said second comparator to assure an integrity of said cryptographic services at said first and second encryption channels.

17. A secure configurable system comprising:
a memory having stored therein a bitstream, said bitstream including encrypted configuration data and a first hash value representing said encrypted configuration data;
a trusted processor in communication with said memory for receiving said bitstream, decrypting said first hash value to obtain an image of said encrypted configuration data, generating a random data word, outputting said random data word, and computing a second hash value of said image of said encrypted configuration data modified by said random data word;
an authentication processor in communication with each of said memory and said trusted processor for receiving said bitstream from said memory and receiving said random data word from said trusted processor, said authentication processor computing a third hash value of said encrypted configuration data from said bitstream modified by said random data word and outputting said third hash value to said trusted processor; and
a programmable logic device (PLD) in communication with said memory for receiving said bitstream, decrypting said encrypted configuration data to obtain said configuration data, and using said configuration data to configure said PLD, wherein said encrypted configuration data is authenticated when said trusted processor determines that said third hash value matches said second hash value, and said trusted processor enables use of said PLD as a configured PLD in response to authentication of said encrypted configuration data.

18. A system as claimed in claim 17 wherein said configured PLD is a cryptographic PLD, said trusted processor includes an output and a return interface, and said trusted processor is configured to execute functional verification code, said functional verification code instructing said processor to perform operations comprising:
instantiating an encryption channel in said cryptographic PLD and a loopback configuration between said output interface, said encryption channel, and said return interface;
communicating a test packet to said encryption channel;
receiving an encrypted test packet from said cryptographic PLD via said loopback configuration; and
determining an integrity of said encrypted test packet, such that when said integrity of said encrypted test packet is acceptable, said trusted processor enables operation of said cryptographic PLD for providing cryptographic services.

19. A system as claimed in claim 18 wherein said functional verification code instructs said trusted processor to perform further operations:
establishing said encryption channel between an insecure external interface and a secure external interface; and
forming said loopback configuration to include path means between said output interface and said insecure external interface and between said secure external interface and said return interface.

20. A system as claimed in claim 17 wherein:
said memory includes an encrypted key stored therein;
said trusted processor is adapted to receive said encrypted key from said memory, decrypt said encrypted key to produce a configuration key, and convey said configuration key to said authentication processor; and
said authentication processor is adapted to forward said configuration key to said PLD for use at said PLD.

21. A system as claimed in claim 17 wherein:
said configured PLD is a cryptographic PLD;
said memory includes a traffic key stored therein;
said trusted processor is adapted to receive said traffic key, split said traffic key into a first portion and a second portion, communicate said first portion of said traffic key to said cryptographic PLD via a first interface, and convey said second portion of said traffic key to said cryptographic PLD via a second interface, said second interface differing from said first interface; and
said cryptographic PLD is adapted to combine said first and second portions to form said traffic key and implement said traffic key to provide cryptographic services.

22. A system as claimed in claim 17 wherein:
said memory is adapted to store key material;
said authentication processor includes a first partition coupled with a first external port and a second partition coupled with a second external port, said second partition being separate from said first partition; and
said trusted processor is adapted to establish a command control path between said second external port and said trusted processor via said second partition, disable said command control path upon receipt of a key fill command via said command control path, receive said key material via said first external port and said first partition following said disabling operation, and convey said key material to said memory for storage in said memory.

23. A system as claimed in claim 17 wherein said configured PLD is a cryptographic PLD comprising:
a first cryptographic channel instantiated at a first region of said cryptographic PLD;
a second cryptographic channel instantiated at a second region of said cryptographic PLD; and
a comparator configured on said cryptographic PLD and isolated from said first and second regions, said cryptographic PLD being configured to perform operations comprising:
receiving a first signal at each of said first and second cryptographic channels;
utilizing cryptographic services at said each of said first and second cryptographic channels to convert said first signal to produce a second signal; and
utilizing said comparator to verify conversion of said first signal to said second signal by said each of said first and second cryptographic channels.

24. A method for secure configuration of a programmable logic device (PLD) comprising:
conveying a bitstream from memory to each of a trusted processor, an authentication processor, and said PLD, said bitstream including encrypted configuration data;
cooperatively authenticating said encrypted configuration data at said authentication processor and said trusted processor;
decrypting, at said PLD, said encrypted configuration data included in said bitstream to obtain configuration data;
configuring said PLD using said configuration data, said decrypting and configuring operations occurring concurrent with said authenticating operation;
when said authentication operation authenticates said encrypted configuration data, enabling use of said PLD as a configured cryptographic PLD;
when said authentication operation fails to authenticate said encrypted configuration data, preventing use of said PLD as said configured cryptographic PLD; and
verifying an operation of said cryptographic PLD in response to said enabling operation, said verifying including:
instantiating an encryption channel and loopback configuration in said cryptographic PLD to said trusted processor;
communicating a test packet from said trusted processor to said encryption channel;
receiving, at said trusted processor, an encrypted test packet from said cryptographic PLD via said loopback configuration;
determining, at said trusted processor an integrity of said encrypted test packet; and
when said integrity of said encrypted test packet is acceptable, enabling operation of said cryptographic PLD for providing cryptographic services.

25. A method as claimed in claim 24 wherein when said integrity of said encrypted test packet is unacceptable, disabling operation of said cryptographic PLD.

* * * * *

UNITED STATES PATENT AND TRADEMARK OFFICE
CERTIFICATE OF CORRECTION

PATENT NO. : 8,095,800 B2
APPLICATION NO. : 12/275097
DATED : January 10, 2012
INVENTOR(S) : Creary et al.

It is certified that error appears in the above-identified patent and that said Letters Patent is hereby corrected as shown below:

The error and requested correction is the named Assignee as listed:
    "General Dynamics C4 System, Inc."

The foregoing correction(s) for the spelling of the named Assignee should read as:
    "GENERAL DYNAMICS C4 SYSTEMS, INC."

Signed and Sealed this
Twenty-eighth Day of February, 2012

David J. Kappos
*Director of the United States Patent and Trademark Office*